E. A. YOUNG.
WELTING.
APPLICATION FILED FEB. 14, 1919.
1,393,476.
Patented Oct. 11, 1921.
2 SHEETS—SHEET 2.
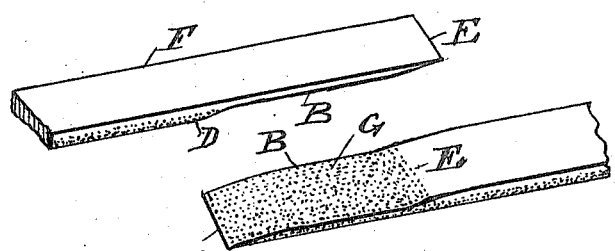
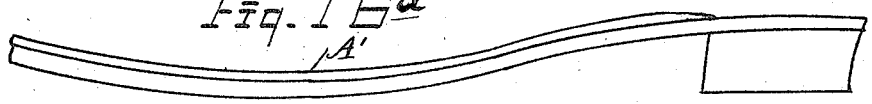
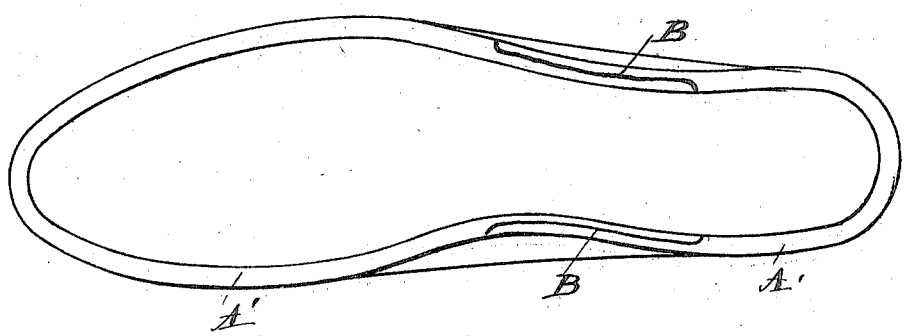

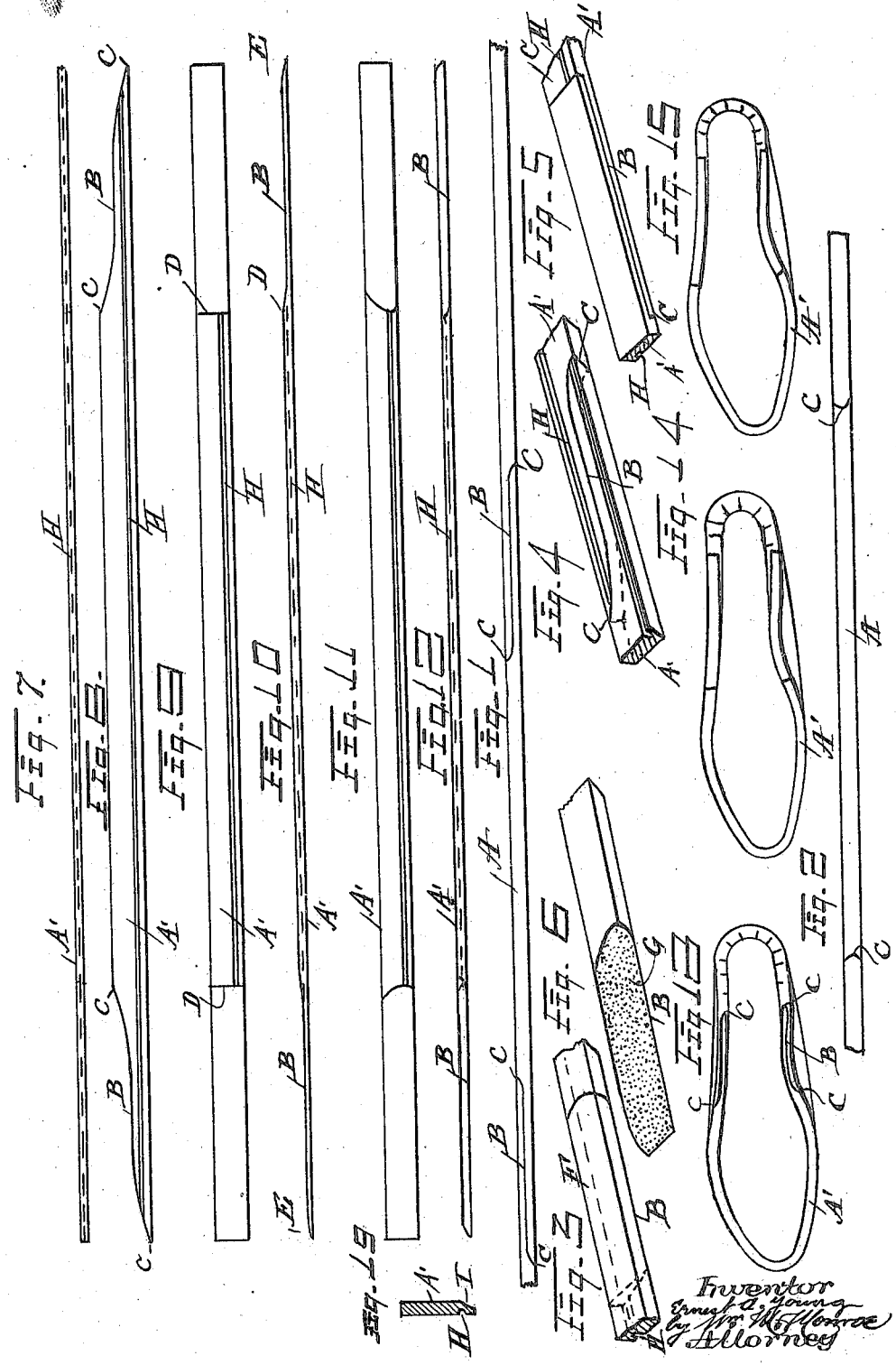

UNITED STATES PATENT OFFICE.

ERNEST A. YOUNG, OF CLEVELAND, OHIO.

WELTING.

1,393,476.

Specification of Letters Patent. Patented Oct. 11, 1921.

Application filed February 14, 1919. Serial No. 276,974.

*To all whom it may concern:*

Be it known that I, ERNEST A. YOUNG, a citizen of the United States, and resident of Cleveland, in the county of Cuyahoga and State of Ohio, have invented certain new and useful Improvements in Welting, of which I hereby declare the following to be a full, clear, and exact description, such as will enable others skilled in the art to which it appertains to make and use the same.

The objects of this invention are to provide an improved form of a flexible strip employed in the manufacture of boots and shoes which is applicable not only to the manufacture of the Goodyear welt shoe, but to the manufacture of shoes and parts of shoes fastened in any way, where a slip, strip, rand, welt or shank doubler, is interposed between the sole and the upper, or in a stitched down shoe where the strip is placed above the upper. The further object is to economize material by so cutting an elongated strip of welting material, that the total combined length of the individual strips so produced will exceed the total length of the original strip from which the individual strips were taken.

The invention includes the use of all flexible strips employed for these and analogous purposes, where the flexible strip is embodied in a boot or shoe as a permanent part thereof.

Flexible strips have heretofore been constructed by cutting the material in long continuous pieces, and after applying the long piece to the sole of the shoe, the ends are cut off at the required points.

This invention comprises an elongated strip of flexible material so cut at predetermined intervals that the component strips cut therefrom overlap at their extremities, and the importance of this feature lies in the saving of material obtained in this manner to the extent of the length of the overlapping parts of the said strips.

Heretofore difficulty has been experienced, when using flexible strips of uniform thickness, in bending them and rounding the curves of the sole at the shank, but with the improved construction, the strips are reduced in section at the shank curves and no difficulty is experienced in stitching the strips to the inseam. The invention is exemplified in its various uses in the accompanying drawings, is hereinafter more fully described and is specifically pointed out in the claims.

In the accompanying drawings, Figure 1 shows in plan a long strip of flexible material and one method of cutting the same to produce single strips whose combined total length exceeds the total length of the original strip.

Fig. 2 is a similar view of a modified form.

Figs. 3, 4 and 5 are perspectives of portions of flexible strips showing several modes of separation whereby an increased linear measurement is obtained over that of the original strip before cutting.

Fig. 6 is a perspective showing ends of the strips shown in Fig. 3.

Fig. 7 is an edge view of a single strip formed as shown in Fig. 1.

Fig. 8 is a plan thereof.

Fig. 9 is a plan of a modified form showing their flat extremities.

Fig. 10 is an edge view thereof.

Fig. 11 is a plan of still another modified form, in which laterally wedge shaped extremities are produced.

Fig. 12 is an edge view thereof.

Fig. 13 is a plan of the bottom of a shoe before the sole and heel are attached, in which a strip, such as shown in Fig. 8 is employed.

Figs. 14 and 15 are similar views, illustrating respectively the use of the forms shown in Figs. 9 and 11.

Fig. 16 shows the separated ends of two single strips and the respective grain and flesh sides thereof.

Fig. 16ª illustrates the use of a strip as shown in Figs. 7 and 8 which does not make the shank thinner. Fig. 17 illustrates the use of the form shown in Figs. 9 and 10 in which the shank portion is thinner.

Fig. 18 illustrates a shank doubler and,

Fig. 19 is a transverse section of a strip.

In the figures, A represents an elongated strip of flexible welting material, which is cut at intervals, on a median line B, parallel to one of the faces of the strip.

The plane of cutting is merged into the lateral edges of the strip in Figs. 1, 4, 8 and 13 at C, C, at the ends of the cuttings, and in Figs. 9 and 10 and 16 the plane of cutting is merged at one end D, D, into the flesh side, and at the other end into the grain side at E, E, thus producing a multiple number of shorter strips A', A';

In Figs. 11 and 12 the same conditions are true, except that the longitudinal cut is taken on a diagonal plane as shown also in Figs. 3 and 6. The elongated portion, or body, of a welt, is attached to the front portion of a shoe, and the elongated reduced extremities are attached to the shank portion of a shoe, and the diagonal cuts at the ends of the welt may run in the same or opposite directions. If only one reduced extremity is employed, it becomes the shank portion of the welt.

In Figs. 9, 10, 11, 12, 6, and 16, the alternate positions of grain and flesh sides are shown. In the portion designated F, the grain side is shown and in the portion designated G, the flesh side is shown. All the overlapping extremities of the individual strips are placed in the shank of the shoe and when the flesh surface as at G' in Fig. 6 comes uppermost very little of the flesh portion is exposed to view from above, because the welt at this portion is considerably trimmed away, and hence it can be used economically.

The usual longitudinal groove H, is shown on the underside of the strip which in Fig. 8 extends the entire length of the strip and in Figs. 9 and 11 may extend only between the reduced extremities or over the entire length of the strip.

I, is the bevel on the inside edge where it is sewed to the inseam.

In Figs. 13, 14, and 15, the use of the strips as a welt is shown. In Fig. 4 a preferred form is shown, in which the cut is made vertically on a median line and merged at its ends in the edges of the strip.

In Figs. 5, 9 and 10 the median cut is horizontal.

In Figs. 3, 6, 11 and 12, the welt is provided with a reduced or tapering extremity by means of a cut which enters the top face of the welt, and follows a line substantially diagonal to the upper and lower faces of the welt at one edge thereof, thence merges into the diagonal plane of the welt which it traverses through the greater length of the cut and finally emerges in a line substantially diagonal to the upper and lower faces of the welt at the opposite edge thereof.

In Figs. 11 and 12 both extremities of one welt are shown and in Fig. 3 two overlapping ends are shown before separation.

In Fig. 17, the welt as shown in Figs. 5, 9, 10 and 16 is shown, illustrating the thinness of the material at the shank.

In Fig. 18 one of the methods of making the overlapped strips for a sole rand and heel rand, and which is the only method of cutting, which leaves the thickness of the shank portion of the welt uniform with the fore part of the welt.

In this manner the strip which forms a permanent part of the shoe between the sole and the upper can be made and applied either to the fore part, shank or the heel seat as desired, and will form respectively a sole rand, shank doubler, or heel rand.

Having described the invention, what I claim as new and desire to secure by Letters Patent is:

1. A flat flexible strip of welting material, having reduced extremities; said extremities cut on median longitudinal planes, the extremities of said cuts merging into opposite sides of said strip.

2. A flexible strip of welting material, having reduced extremities, said extremities cut on median longitudinal planes and one extremity of each cut merging into the grain side of said strip, and the other extremity into the flesh side respectively; the points of greatest reduction being upon the same longitudinal surface of said strip.

3. In a welt in combination, a body portion and integral reduced extremities therefor, each extremity cut upon a longitudinal plane included in a diagonal of the transverse section of the welt for the greater part of the length of the cut, said cut entering at the upper face and emerging at the lower face of said welt.

4. In a welt, an elongated body portion having parallel sides and faces in combination with longitudinally reduced extremities therefor, each extremity having one face inclined to the vertical edge of said welt through the greater part of its length and emerging in the respective upper and lower faces of said welt.

5. In a welt, an elongated body, having a groove on the lower face adjacent to the inside edge thereof and beveled on the upper inside edge, in combination with an integral longitudinally reduced extremity, said extremity provided with a groove and beveled edge in continuation of said groove and bevel in said body portion, said extremity having one face inclined to the vertical edges of said body.

6. In a welt, an elongated body portion having parallel edges and faces, in combination with a longitudinally reduced extremity therefor, said extremity having one face inclined to the vertical edges of said welt through the greater part of its length and merging in the respective upper and lower faces of said welt.

7. An elongated welt for boots and shoes, having straight edges and flat faces, and reduced extremities, one edge of the body portion and extremities of said welt retaining substantially the original thickness of the body throughout, and each extremity of said welt reduced upon a substantially longitudinal, median plane.

8. A welt, comprising an elongated body and reduced extremities, said welt provided with a stitch receiving groove on its lower face adjacent to its inner edge and extending substantially the entire length of the body portion and reduced extremities thereof, and also provided with a beveled upper inner corner extending substantially the whole length of the body portion and said reduced extremities.

9. In a welt, a body portion having parallel top and bottom faces and edges, and elongated reduced extremities, said extremities cut on median longitudinal planes; the ends of the cuts merging into opposite sides of said welt respectively; the inner edge of said welt maintained of substantially the original thickness of the body.

10. In a welt, a body portion having parallel top and bottom faces and edges, and elongated reduced extremities, said extremities adapted to extend substantially over the entire length of the shank portion of a shoe, the body portion adapted to be positioned around the edge of the fore part of said shoe, said welt having a stitch receiving groove upon the lower face adjacent to its inner edge, extending throughout said body and reduced extremities; said groove extending along the newly exposed surfaces produced by the reduction of said extremities.

11. A flexible strip comprising an elongated body portion having parallel edges and faces and elongated reduced extremities, each extremity cut upon a plane diagonal to the cross section of said strip, said cuts merging into the top and bottom face respectively.

12. In a flexible welt, an elongated body provided with parallel edges and faces, and having elongated extremities reduced upon a substantially longitudinal median plane, one edge of said body portion and extremities of said welt retaining substantially the original thickness of the body throughout, said welt provided with a longitudinal groove adjacent to one edge and extending along the body and along the newly exposed surfaces produced by the reduction of said extremities.

13. In a flexible welt, an elongated body provided with parallel edges and faces, and having elongated extremities reduced upon a substantially longitudinal median plane, one edge of said body portion and extremities of said welt retaining substantially the original thickness of the body throughout, said welt provided with a longitudinal groove adjacent to one edge and extending along the body and along the newly exposed surfaces produced by the reduction of said extremities, and said welt being beveled upon the upper corner of the inside edge.

14. In a flexible strip for permanent fixture between the upper and the sole of a shoe, said strip having an elongated body with parallel edges and elongated reduced extremities, said extremities reduced upon a substantially longitudinal plane, the reduced extremities adapted to extend substantially over the entire length of the edges of the shank portion of the shoe and the body portion adapted to extend around the sides of the fore part of the shoe.

15. A welting strip, comprising an elongated body portion, having parallel upper and lower faces and longitudinal edges, and an elongated longitudinally and transversely reduced extremity, the inner edge of said extremity forming a continuation of the inner edge of said body portion and corresponding in thickness therewith throughout substantially all of its length said extremity reduced in thickness upon its outer edge.

16. A welting strip, comprising an elongated body portion, having parallel upper and lower faces and longitudinal edges, and an elongated longitudinally and transversely reduced extremity, the inner edge of said extremity forming a continuation of the inner edge of said body portion and corresponding in thickness therewith throughout substantially all of its length, said extremity reduced in thickness upon its outer edge, said extremity being reduced upon a substantially median longitudinal plane.

17. A welting strip, comprising an elongated body portion, having parallel upper and lower faces and longitudinal edges, and an elongated longitudinally and transversely reduced extremity, constituting the shank portion thereof, the inner edge of said shank portion forming a continuation of the inner edge of said body portion and corresponding in thickness therewith, said shank portion reduced in thickness upon its outer edge.

18. A welting strip, comprising an elongated body portion, having parallel upper and lower faces and longitudinal edges, and an elongated longitudinally and transversely reduced extremity, constituting the shank portion thereof, the inner edge of said shank portion forming a continuation of the inner edge of said body portion and corresponding in thickness therewith, said shank portion reduced in thickness upon its outer edge, said welting strip provided with a stitch-receiving groove on its lower face, adjacent to its inner edge.

In testimony whereof, I hereunto set my hand this 11 day of February, 1919.

ERNEST A. YOUNG.

In presence of—
  WM. M. MONROE,
  S. W. SANGSTER.